US007483948B2

(12) United States Patent
Auhagen

(10) Patent No.: US 7,483,948 B2
(45) Date of Patent: Jan. 27, 2009

(54) UPDATING UNREAD EMAIL MESSAGES

(75) Inventor: Gero Auhagen, Mountain View, CA (US)

(73) Assignee: SAP AG, Walldorf (DE)

( * ) Notice: Subject to any disclaimer, the term of this patent is extended or adjusted under 35 U.S.C. 154(b) by 618 days.

(21) Appl. No.: 11/089,341

(22) Filed: Mar. 24, 2005

(65) Prior Publication Data

US 2006/0230114 A1    Oct. 12, 2006

(51) Int. Cl.
*G06F 15/16* (2006.01)
*G06F 7/00* (2006.01)
(52) U.S. Cl. .................................. 709/206; 707/104.1
(58) Field of Classification Search ................. 709/206, 709/224; 707/104.1
See application file for complete search history.

(56) References Cited

U.S. PATENT DOCUMENTS

| 5,909,689 | A | 6/1999 | Van Ryzin |
| 6,453,337 | B2 | 9/2002 | Miller et al. |
| 7,146,381 | B1 * | 12/2006 | Allen et al. ............... 707/104.1 |
| 7,293,065 | B2 * | 11/2007 | Banister et al. ............ 709/206 |
| 2002/0187794 | A1 * | 12/2002 | Fostick et al. .............. 455/466 |
| 2003/0187996 | A1 * | 10/2003 | Cardina et al. ............ 709/228 |
| 2004/0087300 | A1 * | 5/2004 | Lewis ...................... 455/412.2 |
| 2004/0254998 | A1 * | 12/2004 | Horvitz ..................... 709/206 |
| 2006/0168065 | A1 * | 7/2006 | Martin ...................... 709/206 |

OTHER PUBLICATIONS

Refresh—HTML web page, *Artemis*, obtained from the Internet at http://www.artemis.dk/html-refresh, on Feb. 18, 2005, 1 page.
Refresh—PHP web page, *Artemis*, obtained from the Internet at http://www.artemis.dk/php-refresh, on Feb. 18, 2005, 1 page.
TDSMAIL email screenshot of a Men's Wearhouse ad, document date Oct. 29, 2004, 10 pages.
Recall Email web page, Yenra, obtained from the Internet at http://www.yenra.com/recall-email, on Feb. 18, 2005, 2 pages.

* cited by examiner

*Primary Examiner*—Joseph E Avellino
*Assistant Examiner*—Shaq Taha
(74) *Attorney, Agent, or Firm*—Fish & Richardson P.C.

(57) ABSTRACT

A method for a system to reply to a user email message includes receiving a user email message from a user email address that comprises particularized subject matter. The system creates a first response message that is responsive to the particularized subject matter and creates a second response message that is associated with the first response message and that causes an indication to be received by the system after the second response message is accessed. The system sends the second response message to the user email address. After the second response message is accessed from the user email address, the system receives the indication and makes a determination to send either the first response message or to re-create the first response message and send the re-created response message. Based on the determination, the system sends either the first response message or the re-created response message to the user email address.

15 Claims, 6 Drawing Sheets

UPDATING UNREAD EMAIL MESSAGES

TECHNICAL FIELD

This description relates to processing electronic mail (email) messages.

BACKGROUND

Companies often rely on electronic mail (email) messages to interact with their customers. For example, a company may provide technical support through email messages. To provide technical support through email messages, a company may offer a general email message address to which customers can direct inquiries and requests for assistance. In response to a customer email message that is sent to the general email message address (support@xyzcompany.com, for instance), an agent within the company's technical support department may provide an email message response that answers the customer's inquiry or provides the requested assistance. For example, a customer of a peripheral device provider for computer systems may encounter difficulties in configuring a particular peripheral device. The customer may send an email message requesting assistance to the peripheral device provider. In the email message, the customer may describe a computing environment in which he or she is installing the peripheral device and provide specific details about the configuration difficulties. In response to the customer's email message, an agent in the peripheral device provider's technical support department may reply with instructions for configuring the peripheral device within the customer's specific computing environment.

Since agents in a company's technical support department may receive hundreds or thousands of customer email messages each day, a company may use computer hardware and software (a computer system) to process a large volume of customer email messages. The computer system may assist the company's technical support department by automating several of the tasks related to processing email messages. For example, the computer system may analyze the email message to determine its particularized subject matter and route the email message to a service agent that is likely able to respond to the email message. Or, the computer system may have the capability to "auto-respond." In an auto-response system, the computer system may create a response based on an entry in a response database and send the response to the customer without intervention from a human agent.

Some computer systems facilitate delivery of dynamic content in email messages. For example, a company's marketing computer system may send a large number of email messages to email addresses associated with the company's previous customers, in order, for example, to advertise an upcoming sale. An email message may comprise text and a link to other material stored within the marketing computer system. When a previous customer accesses one of the email messages, the link may cause an indication to be received by the marketing computer system. The indication may indicate that the email message has been accessed and may serve as a request for the other material. The marketing computer system may then send the other material, which might include graphics or multimedia objects, along with time-sensitive price or sale information. Delivering dynamic content may allow the company to minimize the size of each marketing email message and to control, at a global level, information that is disseminated to the previous customers.

SUMMARY

Selectively updating a response to a customer electronic mail (email) message anytime before the customer reads the response may be advantageous in a computer system such as an email response management system (ERMS). The ERMS may apply one or more methods to update the response. Further, the ERMS may advantageously select between methods of updating responses based on certain criteria.

In one general aspect, a method for a system to reply to a user email message, includes receiving, in the system, a user email message from a user email address, the user email message comprising particularized subject matter. The system creates a first response message that is responsive to the particularized subject matter. The system creates a second response message that is associated with the first response message and that causes an indication to be received by the system after the second response message is accessed from the user email address. The system sends the second response message to the user email address. The system receives the indication from the user email address after the second response message is accessed from the user email address and makes a determination to send either the first response message or to re-create the first response message and send the re-created response message. Then, based on the determination, the system sends either the first response message or the re-created response message to the user email address.

An ERMS that can update a response to a customer email message anytime before the customer reads the response may enable a company to deliver accurate, current information to customers. In particular, a feature within the ERMS that can capitalize on a typical delay between when an email message is sent and when it is read may be advantageous. For example, a customer may send, at the end of a business day, an email message requesting assistance from a vendor. The vendor may reply with a response message after the close of the business day, but the customer may not read the response message until the following business day. An ERMS that can capitalize on this delay by updating a response that has changed in the intervening time may be able to provide the customer with current information.

A need to update a response to a customer email message may arise in situations where solutions to a problem that is the subject of the customer email message are rapidly developing or changing. Solutions to a particular problem may change rapidly immediately following the release of a product. Solutions to a particular problem may also change rapidly shortly before a product is recalled, as new information from the field becomes available. For example, a computer peripheral device, such as a wireless access point for use in wireless computer networks, may have an inherent design flaw causing it to be particularly susceptible to interference from other devices—for example, cordless telephone systems. The susceptibility may not be discovered until the wireless access points have been distributed to end users. As information about the design flaw becomes available, the solutions offered by the company's technical support department may evolve. For example, an early solution may focus on software configuration; an intermediate solution may focus on positioning an antenna on the wireless access point in a particular manner; and a final solution may communicate to customers that the product is being recalled and may provide information on obtaining a replacement device.

An ERMS that creates the aforementioned first and second response messages may apply different methods to update a response message. In one implementation, the first response message may comprise a link to an entry in a response database. If the entry changes, the first response message may be updated, and the customer may receive the changed entry upon accessing the second response message and subsequently receiving corresponding updated first response message. In another implementation, the first response message may also comprise a link to an entry in the response database, but the ERMS may re-create the first response message in real time, after the user accesses the second response message. Re-creating the first response message may comprise searching a response component database for all pertinent entries. If new components have been added to the response component database since the original first response message was created, the customer may receive the new components in the re-created response message. The ability to switch between methods of updating responses may enable an ERMS to efficiently deal with a large volume of email messages and deliver the most current information available to customers.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
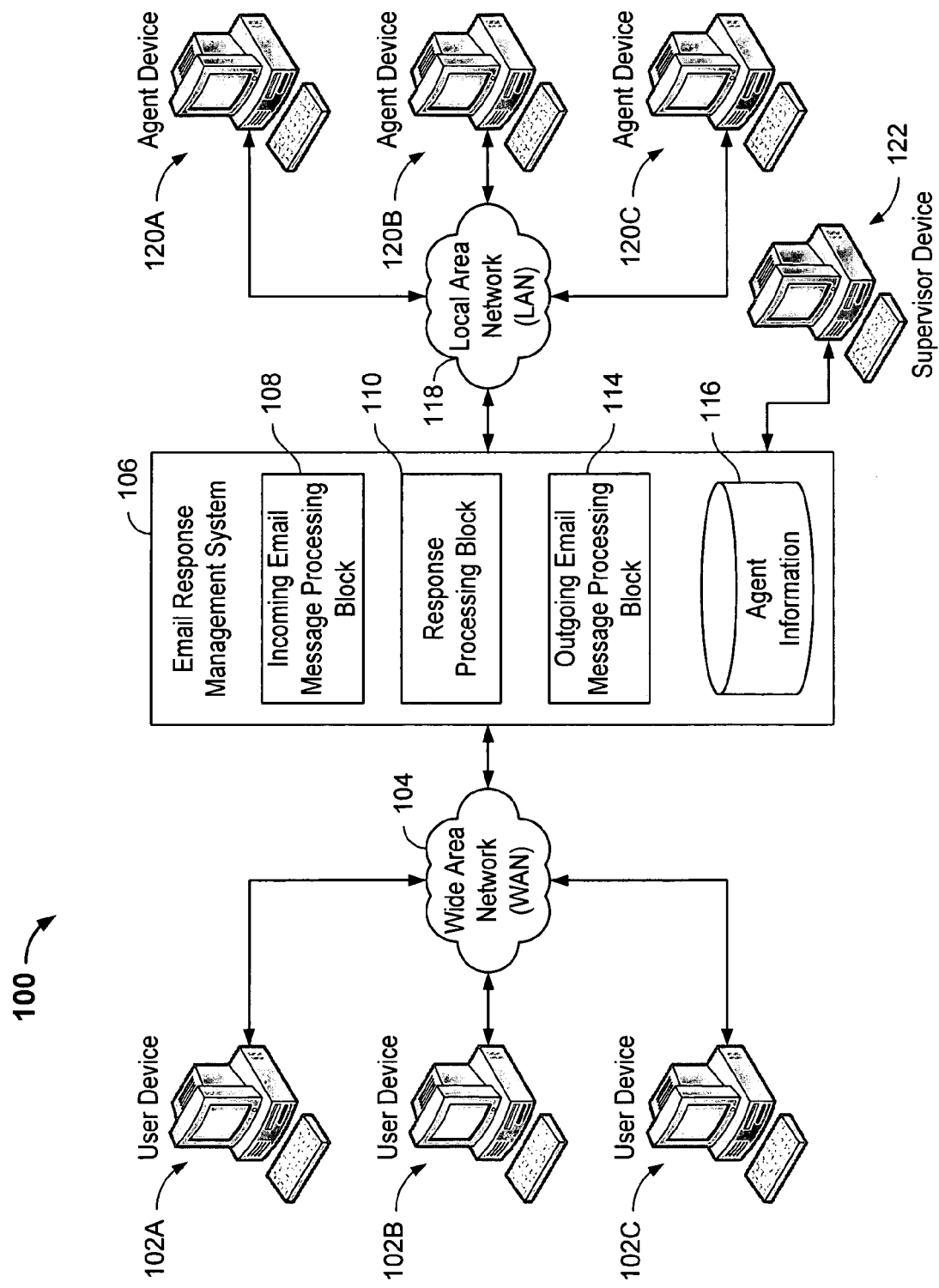
FIG. 1A is a block diagram of the overall environment in which an email response management system (ERMS) can function, according to one implementation.

FIG. 1A is a block diagram of the overall environment 100 in which an email response management system (ERMS) 106 can function, according to one implementation. In this implementation, the ERMS 106 may be used to create and send a response message in reply to an electronic mail (email) message sent from a user email address, by a user from user device 102A, 102B or 102C. The ERMS 106 may subsequently update the response message any time before the user reads it. The ERMS 106 may apply one or more methods to update the response message, and the ERMS 106 may apply different methods to update different response messages.

In one implementation, the user devices 102A, 120B and 120C are coupled to a wide area network (WAN) 104, such as the Internet or a wireless network. Also connected to the WAN 104 is the ERMS 106, capable of receiving user email messages, processing them, responding to them and tracking the responses. In one implementation, the ERMS 106 runs on a computer device of the type shown in FIG. 3. The ERMS 106 may also be coupled to a local area network (LAN) 118, such as a company's Ethernet network. Agent devices 120A, 120B and 120C may connect to the ERMS 106 through the LAN 118. Agents may use the agent devices 120A, 120B or 120C to connect to the ERMS 106 through the LAN 118. In this manner, agents may direct and participate in the email message processing and response message processing performed by the ERMS 106.

In one implementation, the ERMS 106 is coupled to a separate supervisor device 122 through which a supervisor or administrator may interact with the ERMS 106. The supervisor device 122 may connect directly to the ERMS 106 (as shown), or it may connect to the ERMS 106 through the LAN 118 (indirect connection not shown). Through the supervisor device 122, a supervisor or administrator may have more control over the functioning of the ERMS 106 than through an agent device 120A, 120B or 120C.

In one implementation, the ERMS 106 receives, through the WAN 104, a user email message from a user email address, sent by a user employing a user device 102A, 102B or 102C. The ERMS 106, via an incoming email user message processing block 108, receives the incoming email message and processes it to determine its particularized subject matter, as is further described with reference to FIG. 1B.

Based on the particularized subject matter of the user email message, the ERMS 106 creates a first response message using a response processing block 110, according to one implementation, as is further described with reference to FIG. 1B. In one implementation, the ERMS 106 creates the first response message automatically, without human intervention. In one implementation, the ERMS 106 receives input from a human agent using one of the agent devices 120A, 120B or 120C that specifies a basis for the first response message. For example, the ERMS 106 may receive content for a response from a human agent using agent device 120A and may incorporate that content into a first response message that includes other boilerplate information, such as a reference to a web page or instructions for further assistance. In one implementation, the ERMS 106 creates the first response message by combining automatic action from the ERMS 106 with action from a human agent using one of the agent devices 120A, 120B or 120C. In this implementation, the ERMS 106 creates at least a portion of the first response message without human intervention. The ERMS 106 may store information about the first response message in the response processing block 110.

The ERMS 106 also creates a second response message that is associated with the first response message. An outgoing email message processing block 114 delivers the second response message to the user email address. In one implementation, the second response message includes a link to the first response message. The link may include hypertext markup language (HTML) content that causes an indication to be received by the ERMS after the second response message is accessed from the user email address. Here, the actual content of the first response message may remain in the ERMS 106 until the user accesses the second response message. After the user accesses the second response message, the indication is received by the ERMS 106. The indication may serve as a request for the first response message to be sent to the user email address. In some implementations, the sent response may be an updated version of the originally created first response messages.

Figure 1B:
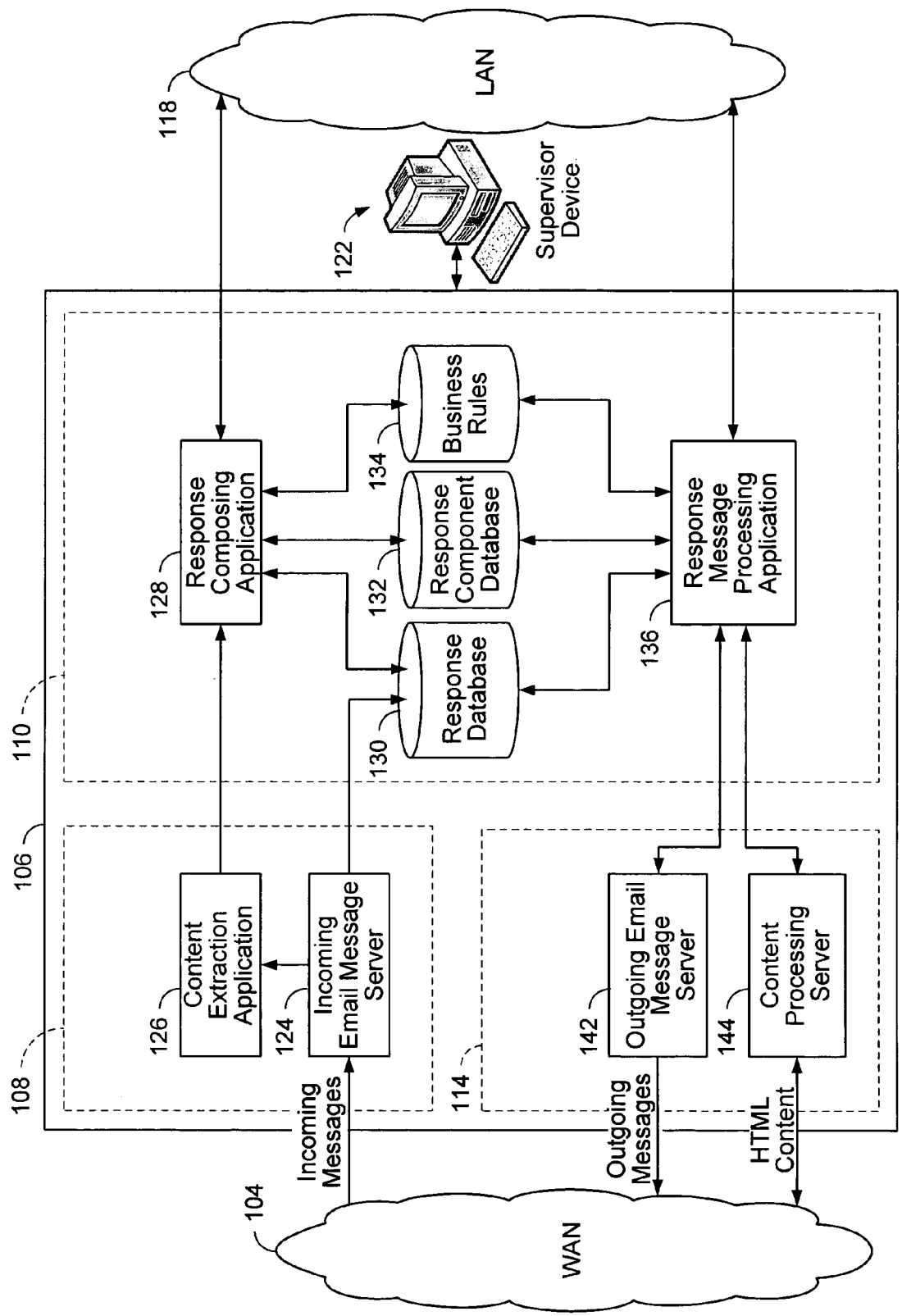
FIG. 1B is a block diagram showing additional details of the ERMS shown in FIG. 1A, according to one implementation.

FIG. 1B is a block diagram showing additional details of the ERMS 106 shown in FIG. 1A, according to one implementation. The incoming email message processing block 108, in one implementation, includes an incoming email message server 124 and a content extraction application 126. The incoming email message server 124 is connected to the WAN 104 and is capable of receiving email messages in various formats from users through the WAN 104. For example, the incoming email message server 124 may be a Post Office protocol 3 (POP3) server, and it may receive email messages in plain text format, in HTML format, or in other email message formats. In one implementation, the incoming email message server 124 is connected to a response database 130. In this implementation, the ERMS 106 may store user email messages in the response database 130. The ERMS 106 may also store other information that is generated during the processing of the email message in the response database 130. For example, the ERMS 106 may store tracking information, such as the date and time the email message was received and status information, such as whether the particularized subject matter has been determined, whether first and second response messages have been created, whether the second response message has been sent, or whether the second response message has been accessed. The incoming email message server 124 is also connected to a content extraction application 126.

The ERMS 106 uses the content extraction application 126 to analyze an email message to determine its particularized subject matter ("content"). Analyzing the message to determine its content may include keyword analysis, natural language processing, or other content extraction methods. The operation of the content extraction application 126 is further described with reference to a typical email message, provided in Table 1.

TABLE 1

Typical User Email Message

| TO: | support@xyzcompany.com |
|---|---|
| FROM: | John C. Doe [johncdoe@isp.com] |
| SUBJECT: | Problem with wireless access point H1700-96 |
| MESSAGE: | I have been unable to get my H1700-96 wireless access point to consistently function. Sometimes, I am able to connect, from a remote device, to my network through the wireless access point. However, the connection is usually broken after a short period of time. The wireless access point only intermittently functions. I have followed all of the troubleshooting instructions to no avail. Please help. Regards, John C. Doe |

Referring to the typical email message provided in Table 1, the ERMS 106 may run the content extraction application 126 to determine the content of the email message. Here, the ERMS 106 determines that the email message refers to an H1700-96 model wireless access point and to intermittent connection problems. The ERMS 106 can use this content information to create a first response message in the response processing block 110.

The response processing block 110, in one implementation, includes a response composing application 128, the response database 130, a response component database 132 and business rules 134. The response component database 132 may include solutions to common problems or responses to common inquiries received by the ERMS 106. For example, the response component database 132 may include several solutions for common problems related to an H1700-96 wireless access point. More specifically, the response component database 132 may include a solution for intermittent connection problems in an H1700-96 wireless access point.

The contents of the response component database 132 may be initially created and stored in the database by agents using the agent devices 120A, 120B or 120C (shown in FIG. 1A). Or, a supervisor or administrator using the supervisor device 122 may create and store database components in the response component database 132. Or, the contents of the response component database 132 may be automatically created by the ERMS 106 based on email message responses created by human agents. For example, the ERMS 106 may adaptively "learn" input entered by human agents and received by the ERMS and may store those responses in the response component database 132 for future use.

In one implementation, the ERMS 106 runs the response composing application 128 to search for a solution among the solutions stored in the response component database 132, based on the content the ERMS 106 extracted by running the content extraction application 126. For example, referring again to the typical email message that is shown in Table 1, the ERMS 106 may search the response component database 132 for a solution related to intermittent connection problems in an H1700-96 wireless access point. Upon finding a pertinent solution, the ERMS 106 may retrieve the solution and incorporate it in a first response message. The ERMS 106 may then store the first response message in the response database 130. The ERMS 106 may store other information related to the user email message in the response database 130. For example, the ERMS 106 may store one or more flags related to processing a user email message, as will be further described with reference to FIG. 1C. The ERMS 106 may also store the user email message itself in the response database 130.

The ERMS 106 may use business rules 134 to determine which actions to take at various points in creating and processing a response message. For example, the ERMS 106 may automatically respond to some types of user email messages without any intervention by human agents. For other types of email messages, human agents may need to review the response message before it is sent to the user email address. Whether human intervention is required may be stored in the business rules 134. In creating a first response message to reply to a user email message, the ERMS 106 may run the response composing application 128 to retrieve a business rule from the business rules 134 and compose the message according to the rule. If, based on the execution of the business rule, the ERMS 106 determines that human agent review of the response message is needed, the ERMS 106 may prompt a human agent using one of the agent devices 120A, 120B or 120C to review the response. When human agent review is required, the ERMS 106 may execute a business rule in conjunction with the agent information 116 (shown in FIG. 1A) to determine how to route the response for review. The agent information 116 may catalog specific skills of each agent to enable the ERMS 106 to route response messages appropriately. For example, the agent information 116 may indicate that a particular agent has experience in working with wireless access points; on the basis of this agent information 116, the ERMS 106 may route response messages that require review to that particular agent when the response messages pertain to wireless access points.

Once the ERMS 106 creates and stores the first response message in the response database 130, the ERMS 106 may use a response message processing application 136 to prepare a second response message for delivery to the user email address. In one implementation, the second response message is associated with the first response message and causes an indication to be received by the ERMS 106 after the second response message is accessed from the user email address. The second response message may be associated with the first response message by a link to the first response message that is stored in the response database 130. In this implementation, the first response message is not sent to the user email address, but when a user accesses the second response message from the user email address, the link causes an indication to be sent to the ERMS, and the indication serves as a request for the first response. The indication could result from, for example, HTML content in the second response message, or the indication could result from any other method of delivering dynamic content to the user email address. For example, dynamic content could also be delivered using any other Extensible Markup Language (XML) or Multipurpose Internet Mail Extensions (MIME) type supported by an email reader application, such as, but not limited to XML, Flash, Dynamic HTML (DHTML). Once the response message processing application 136 has created the second response message, it conveys the second response message to the outgoing email message processing block 114 for delivery to the user email address.

The outgoing email message processing block 114, in one implementation, includes an outgoing email message server 142 and a content processing server 144. The outgoing email message server 142 is capable of delivering the second response message to the user email address through the WAN 104 in various formats. For example, the outgoing email message server 142 may be a Simple Mail Transfer Protocol (SMTP) server, capable of delivering email messages in HTML format and in other formats that facilitate delivery of dynamic content.

The content processing server 144, in one implementation, can receive the indication that serves as a request for the first response message after the user accesses the second response message. After the content processing server 144 receives the indication, it may, in conjunction with the response processing block 110, deliver the first response message to the user email address. The first response message may include content that has been updated since the second response message was sent to the user email address, as is further explained with reference to FIG. 1D.

Figure 1C:
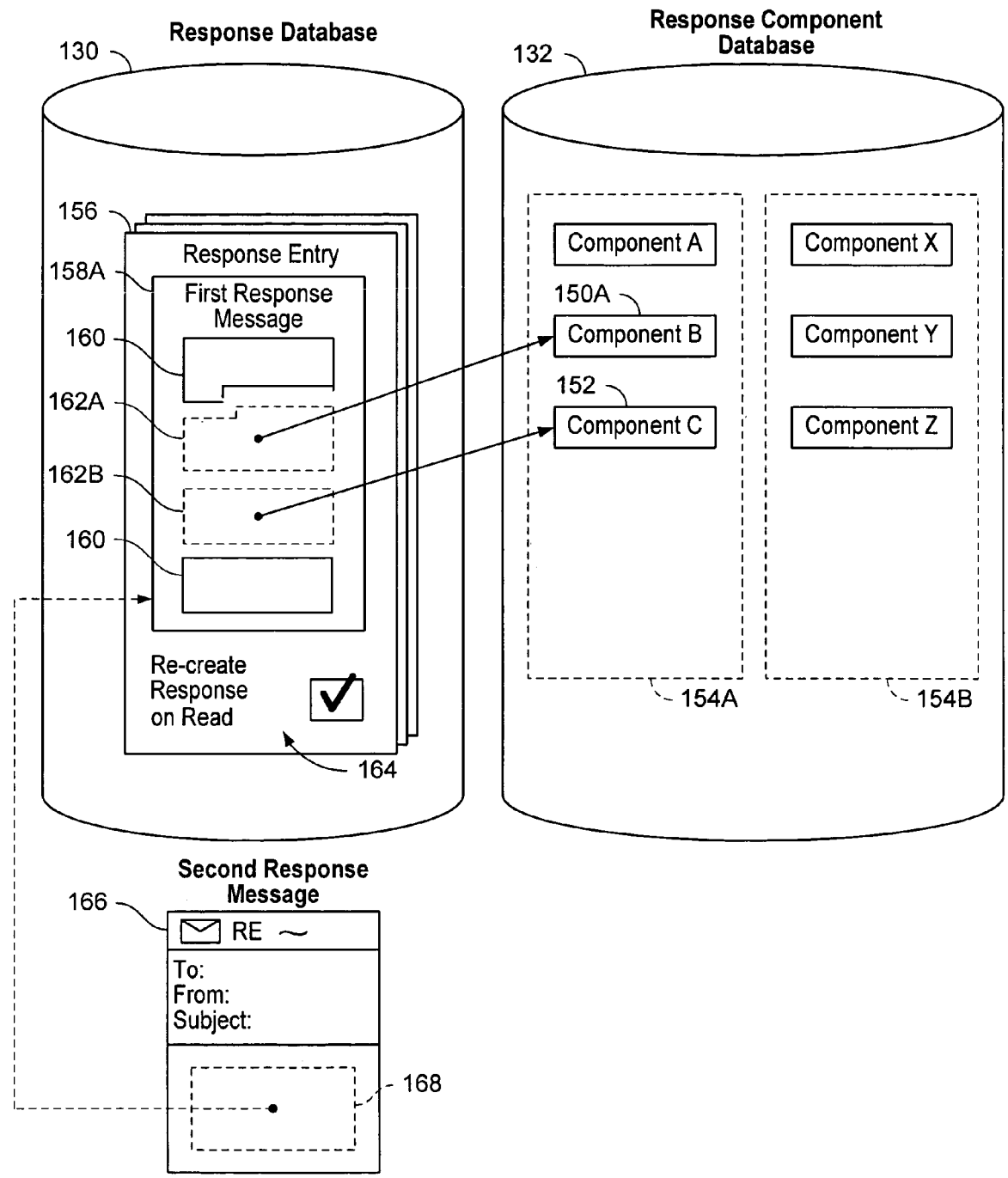
FIG. 1C is a block diagram showing a response message and additional details of the response database and response component database shown in FIG. 1B, according to a first implementation.

FIG. 1C shows additional details of the contents of the response database 130 and of the response component database 132, according to one implementation. The response component database 132 may comprise a plurality of solution components or response components ("components"), of which Component B 150A and Component C 152 are two. Each component may be a specific solution to a common problem or a specific response to a common inquiry received by the ERMS 106. For example, Component B 150A may be a solution to a common software configuration problem for an H1700-96 wireless access point; Component C 152 may be a response to an inquiry regarding software updates that may be downloaded for the same product.

The components may be indexed into, or organized by, related categories. For example, a category 154A may include components related to an H1700-96 wireless access point; a category 154B may include components related to a particular universal serial bus (USB) storage device component.

The components in the response component database 132 may be modified and updated by agents using the agent devices 120A, 120B or 120C (shown in FIG. 1A). Or, the components may be automatically updated by a supervisor or administrator using the supervise device 122. Or, the ERMS 106 may update the components based on messages created by human agents. For example, the ERMS 106 may adaptively "learn" updates to components based on response messages entered by human agents.

The response database 130 may include a plurality of response entries, each of which may be similar to the response entry 156 shown in FIG. 1C. The response entry 156, in one implementation, comprises a first response message 158A and at least one flag 164. The first response message 158A may comprise one or more components, or links 162A and 162B to components in the response component database 132. The first response message 158A may also include filler 160, which may include text that is not directly related to the subject matter of the user email message. For example, the filler 160 may include a generic salutation and closing appropriate for a response message, along with a brief summary of the subject matter of the original user email message.

To create the first response message 158A, the response composing application 128 (shown in FIG. 1B) may search the response component database 132 for one or more components that are pertinent to the particularized subject matter extracted from the user email message. The response composing application 128 may then incorporate the one or more pertinent components and filler 160 into a first response message 158A.

After the response composing application 128 creates the first response message 158A, the response processing application 136 may create a second response message 166. The second response message 166 may include a link 168 to the first response message 158A stored within the response database 130. In one implementation, the link comprises HTML content. In one implementation, when the user accesses the second response message 166, the link 168 causes an indication to be sent to the ERMS 106 that can serve as a request to deliver the response 158A to the user email address. In one implementation, the second response message 166 may include some of the filler 160. In another implementation, the second response message 166 may comprise only a link 168 to the first response message.

After the response processing application 136 creates the second response message 166, it conveys the second response message 166 to the outgoing email message processing block 114 for delivery to the user email address. In one implementation, the outgoing email message server 142 sends the second response message 166.

When a user, from the user email address, accesses the second response message 166, the link 168 causes an indication to be sent to the ERMS 106 that can serve as a request to deliver the first response message 158A to the user email address. The content processing server 144 may receive the indication and may, in conjunction with the response processing application 136 and the response database 130, deliver the first response message to the user email address. In one implementation, the delivered response message may be the first response message 158A previously stored in the response database 130. In another implementation, the first response message 158A may be re-created before being delivered. For example, if the re-create-response-on-read flag 164 is set, the response processing application 136 may cause the response composing application 128 to re-create the first response message before delivering it to the user email address, as will be described in more detail below.

Figure 1D:
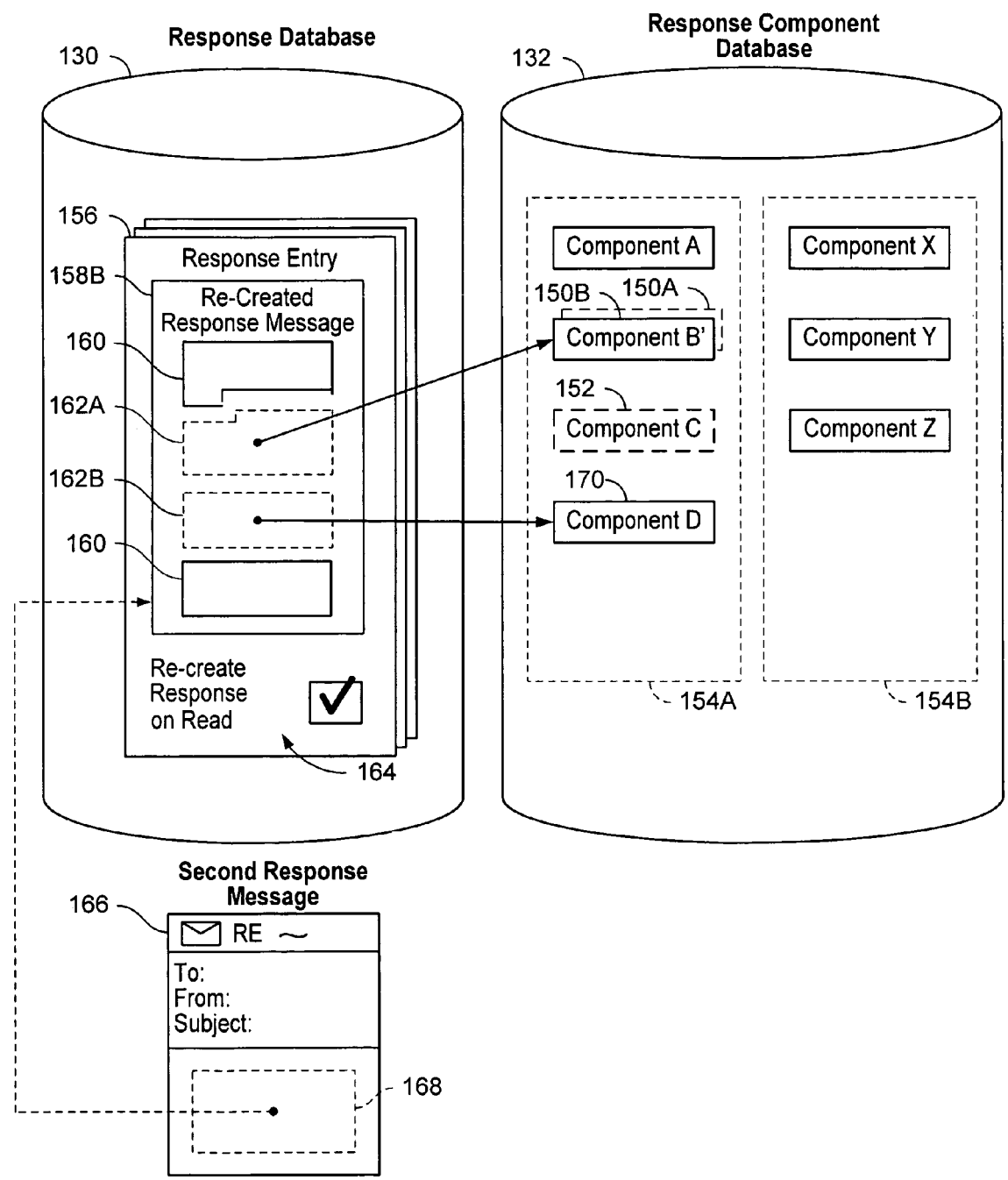
FIG. 1D is a block diagram showing a response message and additional details of the response database and response component database shown in FIG. 1B, according to a second implementation.

FIG. 1D shows an example of an updated response message. In one implementation, a specific component in the response component database 132 may have been updated since the first response message 158A was created. For example, Component B 150A may have been updated, and the updated Component B' 150B may be stored in the same location, such that any link previously made to Component B 150A now links to Component B' 150B. If Component B 150A is updated to Component B' 150B between the time when the second response message 166 is sent to the user email address and the time when the first response message 158A is delivered to the user email address, then the user may receive an updated response message, since at the time the response 158A is sent, the link 162A is to the updated Component B' 150B.

In another implementation, the response component database 132 may have undergone more substantial updates in the intervening time between when the second response message 166 was sent and when the second response message 158A is accessed. For example, Component C 152 may have been deleted, and Component D 170 may have been added. If Component D 170 is pertinent to the particularized subject matter of the user email message, then it may, in one implementation, be delivered to the user email address if the first response message 158A is re-created.

The first response message 158A may be re-created, in one implementation, if the re-create-response-on-read flag 164 is set in the corresponding response entry 156. To re-create the first response message 158A, the ERMS 106 may re-run the response composing application 128 (shown in FIG. 1B), which may re-search the component database 132 for pertinent response components. As shown in FIG. 1D, a second search by the response composing application 128 locates the added Component D 170, and the response composing application 128 incorporates this component into a re-created response message 158B. By re-creating the response, the ERMS 106 may deliver to the user email address more substantial updates that have been made in the intervening time between when the first response message was originally created and when the user accesses the second response message.

To prevent the user from perceiving a long delay between accessing the second response message 166 and receiving a re-created response message 158B, the ERMS 106 should re-create the first response message in substantially "real time." In other words, as soon as the ERMS 106 receives an indication that serves as a request for a first response message that is to be re-created, it should re-create and send the response message. Because re-creating a response message takes a finite amount of processing time within the ERMS 106, the ERMS 106 may be limited in the number of response messages it can re-create within a short period of time, before users perceive substantial delays in receiving first response messages or re-created response messages after accessing second response messages. Therefore, in one implementation, it may be advantageous to only re-create certain response messages. For example, in an ERMS 106 that creates and sends response messages related to products within a company's product line, it may be advantageous to only re-create response messages that are associated with certain products. These products may include products that have just been released, or products that are associated with a sudden increase in user email messages. For example, the ERMS 106 may be configured to re-create response messages associated with a just-released wireless access point, while the ERMS 106 may be configured not to re-create response messages associated with a USB storage device product that has been on the market for a long period of time.

As described earlier, to differentiate response messages that should be re-created from those that should be sent without being re-created, the ERMS 106 may use the re-create-response-on-read flag 164. This flag 164 may be set (or cleared) by an agent using one of the agent devices 120A-120C (shown in FIG. 1A), or by a supervisor or administrator using the supervisor device 122, or by the ERMS 106. For example, in one implementation, the ERMS 106 may be configured to set the flag 164—causing a first response message to be re-created after the user accesses the second response message—if the first response message incorporates a component from the response component database 132 within a particular category (for example, category 154A). In another implementation, the ERMS 106 may set the flag 164 if the user email message includes certain content, for example, content related to a just-released wireless access point. In another implementation, the ERMS 106 may set the flag 164 if the user email message is sent from a particular user email address. For example, the ERMS 106 may be configured to process all email messages from a particular user email address in a predefined manner to ensure that a user associated with that user email address always receives current information. Such configuration information could be stored, for example, in the business rules 134. In another implementation, the ERMS 106 may set the flag 164 if the response message references a component that has frequently or recently been updated. For example, the ERMS 106 may track the frequency with which a particular component in the response component database 132 is updated. If that frequency exceeds a threshold frequency, the ERMS 106 may set the flag 164 for all response messages that include that particular component. In another implementation, the flag 164 may be set or cleared on a global basis, causing the ERMS 106 to either re-create all corresponding first response messages when users access second response messages or to re-create none of the corresponding first response messages when users access the second response messages. For example, a supervisor or administrator using the supervisor device 122 may set one of the business rules 134 to set, clear or override a specific flag 164 in a response 158A. By facilitating the delivery of first response messages that include updated components and responses that have been re-created, an ERMS 106 may be able to provide users with current information.

Figure 2:
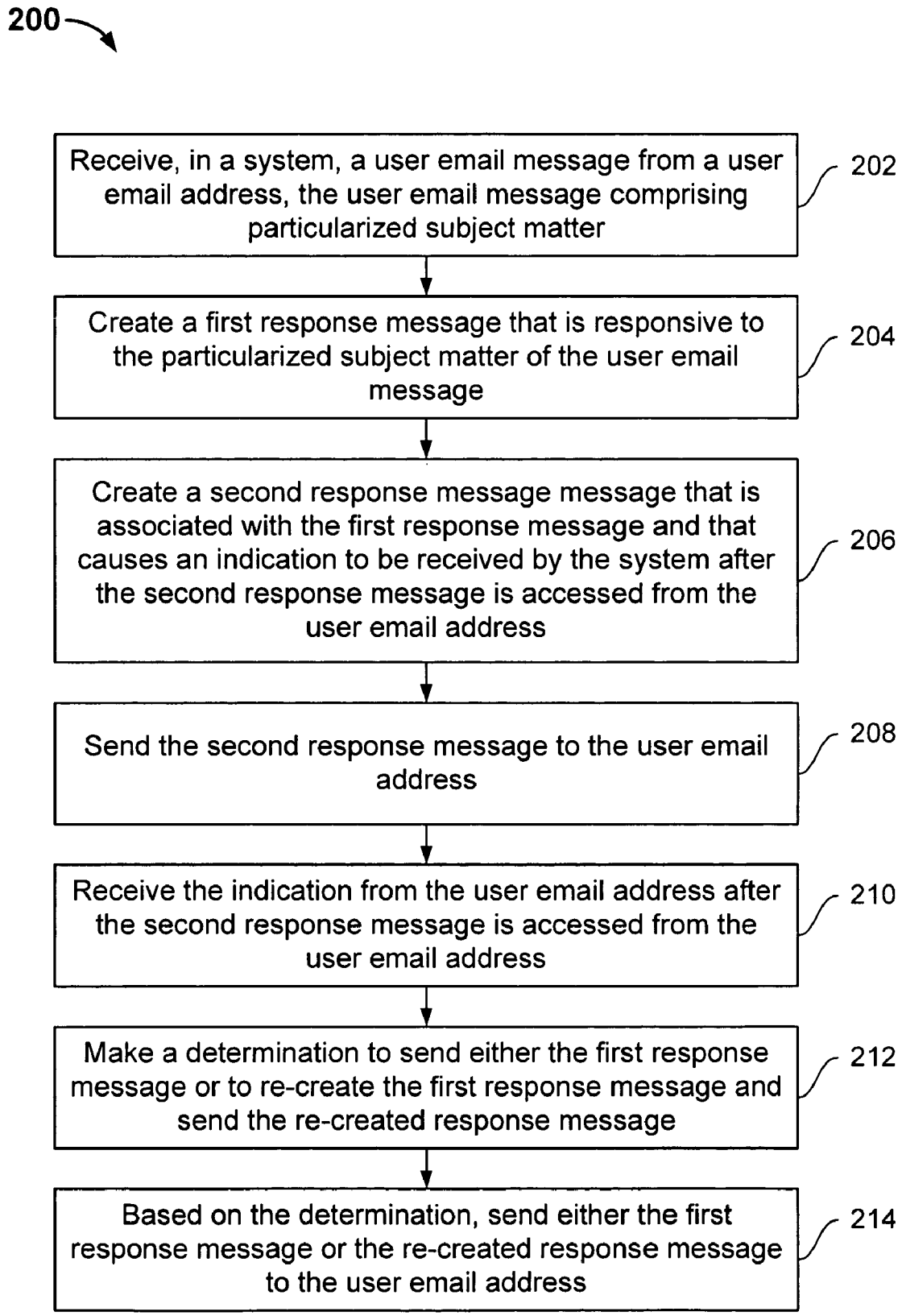
FIG. 2 is a flow diagram of a method that the ERMS shown in FIG. 1A and FIG. 1B can use to update a response, according to one implementation.

FIG. 2 is a flow diagram of a method 200 the ERMS 106 that is shown in FIG. 1A or FIG. 1B can use to update a response to a customer email message anytime before the customer reads the response, according to one implementation. The method 200 may be performed in the system 100. For example, a computer program product can include instructions that cause a processor of the ERMS 106 to perform the actions of method 200.

In an action 202, the ERMS 106 receives a user email message from a user email address, the user email message comprising particularized subject matter. For example, the ERMS 106 may receive an incoming user message through its incoming email message server 124. The ERMS 106 may run a content extraction application 126 to extract the content or particularized subject matter of the user message.

In an action 204, the ERMS 106 creates a first response message that is responsive to the particularized subject matter of the user email message. For example, the ERMS 106 may run a response composing application 128 to search a response component database 132 for components that are pertinent to the subject matter of the user message. The ERMS 106, also through the response composing application 128, may incorporate a pertinent component 150A and filler 160 into a response 158A. The ERMS 106 may store the first response message 158A in the response database 130. The stored first response message 158A may comprise a link 162A to a pertinent component 150A stored in the response component database 132. The filler 160 may be physically stored in the response database 130, or it may also be linked to the response database 130. For example, generic filler, such as a generic salutation, may be stored as a component in the response component database 132, whereas subject-specific filler, such as a brief summary of the subject matter of the original user email message, may be stored in the response database 130.

In an action 206, the ERMS 106 creates a second response message that is associated with the first response message and that causes an indication to be received by the system after the second response message is accessed from the user email address. For example, the ERMS 106 may run the response message processing application 136 to create a second response message 166. The second response message 166 may comprise a link 168 to the first response message 158A.

In an action 208, the ERMS 106 sends the second response message to the user email address. For example, once the second response message 166 has been created, the outgoing email message server 142 may send it to the user email address.

In an action 210, the ERMS 106 receives the indication from the user email address after the second response message 166 is accessed. For example, when the user accesses the response message 166, a link 168 may cause an indication to be received by the content processing server 144. Receipt of the indication may cause the ERMS 106 to deliver the first response message 158A.

In an action 212, the ERMS 106 makes a determination to send either the first response message 158A or to re-create the first response message and send the re-created response message 158B. For example, upon receiving the indication, the ERMS 106 may examine the flag 164 associated with the requested response 158A. The ERMS 106 may also examine the business rules 134. Based on one or both of these examinations, the ERMS 106 may determine whether to re-create the first response message. For example, if the flag 164 is set, and if it is not overridden by any of the business rules 134, the ERMS 106 may re-create the first response message 158A. If the ERMS 106 determines to re-create the first response message 158A, it may re-run the response composing application 128 to re-search the response component database 132 and re-create and send a re-created response message 158B that incorporates Component B' 150B and Component D 170.

In an action 214, the ERMS 106, based on the determination, sends either the first response message or the re-created response message to the user email address. For example, the ERMS 106 may, with the response message processing application 136 and content processing server 144, deliver the first response message 158A (which may include updates to individual components-for example Component B' 150B instead of Component B 150A) or deliver a re-created response message 158B (which may include different components-for example Component D 170 instead of Component C 152).

Figure 3:
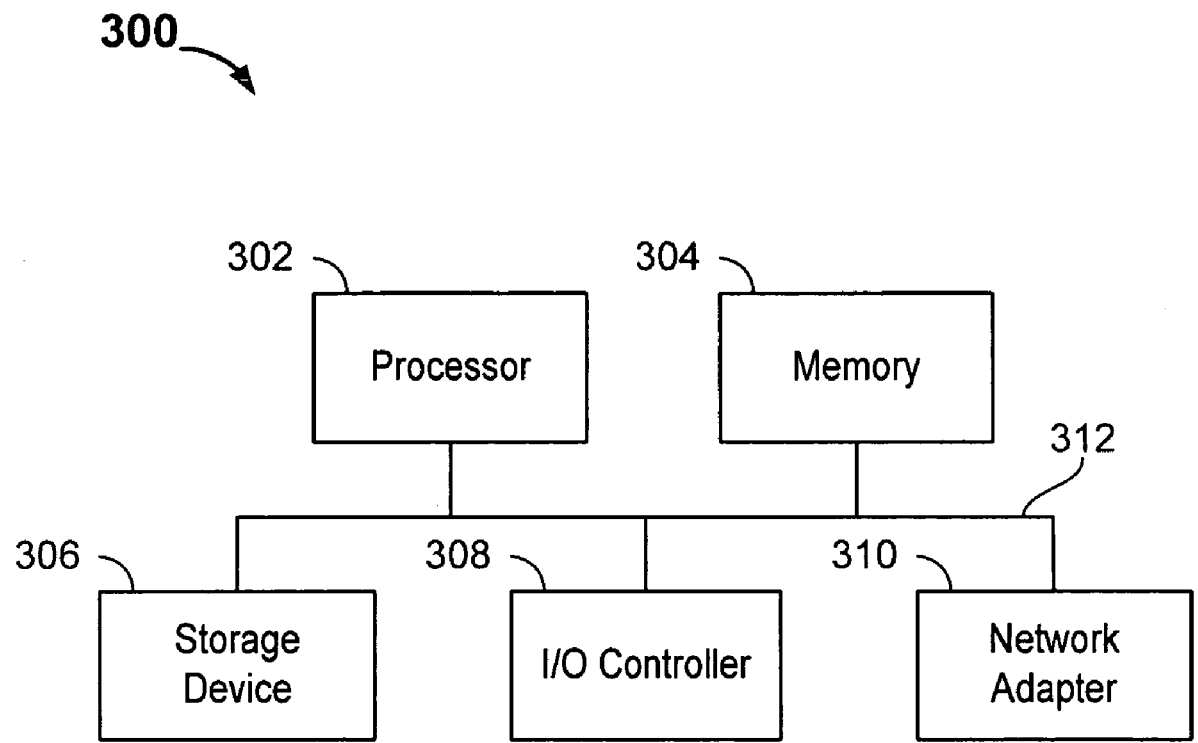
FIG. 3 is a block diagram of an exemplary computing device that may be included within user devices, agent devices, the supervisor device or the ERMS shown in FIG. 1A and FIG. 1B.

FIG. 3 is a block diagram of an exemplary computing device 300 that may be included in the user devices 102A, 102B and 102C; the agent devices 120A, 120B and 120C; the supervisor device 122; or the ERMS 106 shown in FIG. 1A or FIG. 1B, according to one implementation.

The computing device 300 includes a processor 302, a memory 304, a storage device 306, an input/output (I/O) controller 308, and a network adaptor 310. Each of the components 302, 304, 306, 308, and 310 are interconnected using a system bus 312.

The processor 302 is capable of processing instructions for execution in the computing device 300. In one implementation, the processor 302 is a single-threaded processor. In another implementation, the processor 302 is a multi-threaded processor. The processor 302 is capable of processing instructions stored in the memory 304 or on the storage device 306 to display graphical information for a graphical user interface (GUI) on an external input/output device that is coupled to the input/output controller 308.

The memory 304 stores information within the computing device 300. In one implementation, the memory 304 is a computer-readable medium. In one implementation, the memory 304 is a volatile memory unit. In another implementation, the memory 304 is a non-volatile memory unit.

The storage device 306 is capable of providing mass storage for the computing device 300. In one implementation, the storage device 306 is a computer-readable medium. In various different implementations, the storage device 306 may be a floppy disk device, a hard disk device, an optical disk device, or a tape device.

In one implementation, a computer program product is tangibly embodied in an information carrier. The computer program product contains instructions that, when executed, perform one or more methods, such as those described above. The information carrier is a computer-readable or machine-readable medium, such as the memory 304, the storage device 306, or a propagated signal.

The input/output controller 308 manages input/output operations for the computing device 300. In one implementation, the input/output controller 308 is coupled to an external input/output device, such as a keyboard, a pointing device, or a display unit that is capable of displaying various GUI's to a user.

The computing device 300 further includes the network adaptor 310. The computing device 300 uses the network adaptor 310 to communicate with other network devices. If, for example, the user device 102A includes the computing device 300, the computing device 300 uses its network adaptor 310 to communicate with the ERMS 106 over the WAN 104.

A number of implementations have been described. Nevertheless, it will be understood that various modifications may be made without departing from the spirit and scope of this disclosure. Accordingly, other implementations are within the scope of the following claims.

What is claimed is:

1. In a system that processes incoming user electronic mail (email) messages and sends response messages, a computer program product tangibly embodied in a computer-readable medium, the computer program product comprising instructions that, when executed, perform a method for replying to a user email message sent from a user email address, the method comprising:

receiving, in a system, a user email message from a user email address, the user email message comprising particularized subject matter;

creating a first response message that is responsive to the particularized subject matter of the user email message, and storing the first response message;

creating a second response message that is associated with the first response message and that causes an indication to be received by the system after the second response message is accessed from the user email address;

sending the second response message to the user email address;

receiving the indication after the second response message is accessed from the user email address;

after receiving the indication, making a determination to send either the stored first response message or to re-create the first response message and send the re-created response message, wherein the re-created response message is different than the stored first response message; and based on the determination, sending either the stored first response message or the re-created response message to the user email address.

2. The computer program product of claim 1, wherein the method further comprises processing the user email message to extract the particularized subject matter.

3. The computer program product of claim 2, wherein processing the user email message to extract the particularized subject matter comprises natural language processing.

4. The computer program product of claim 1, wherein determining whether to deliver the re-created response message comprises determining based on the particularized subject matter.

5. The computer program product of claim 1, wherein creating the first response message comprises searching a response component database and selecting a component therein to include in the first response message.

6. The computer program product of claim 5, wherein determining whether to deliver the re-created response message comprises determining based on the component that is selected.

7. The computer program product of claim 5, wherein the method further comprises periodically updating one or more components in the response component database.

8. The computer program product of claim 7, wherein the method further comprises adding a new component to the response component database.

9. In a system that processes incoming user electronic mail (email) messages and sends response messages, a computer program product tangibly embodied in a computer-readable medium, the computer program product comprising instructions that, when executed, perform a method for replying to a user email message sent from a user email address, the method comprising:

receiving, in a system, a user email message from a user email address, the user email message comprising particularized subject matter;

creating a first response message that is responsive to the particularized subject matter of the user email message, wherein creating the first response message comprises searching a response component database and selecting a component therein to include in the first response message, and wherein one or more components are periodically updated in the response component database;

creating a second response message that is associated with the first response message and that causes an indication to be received by the system after the second response message is accessed from the user email address;

sending the second response message to the user email address;

receiving the indication after the second response message is accessed from the user email address;

making a determination to send either the first response message or to re-create the first response message and send the re-created response message, wherein determining whether to deliver the re-created response message comprises determining based on whether a frequency with which the one or more components are updated exceeds a threshold frequency; and based on the determination, sending either the first response message or the re-created response message to the user email address.

10. The computer program product of claim 1, wherein determining whether to deliver the re-created response message comprises determining based on status of a flag.

11. The computer program product of claim 10, wherein the flag is set based on at least one of:
a) input received from a supervisor device; and
b) input received from an agent device.

12. The computer program product of claim 1, wherein determining whether to deliver the re-created response message comprises determining based on the user email address.

13. The computer program product of claim 1, wherein the indication is received as a result of hypertext markup language (HTML) content included in the second response message.

14. In a system that processes incoming user electronic mail (email) messages and sends response messages, a method for replying to a user email message sent from a user email address, the method comprising:

receiving, in a system, a user email message from a user email address, the user email message comprising particularized subject matter;

creating a first response message that is responsive to the particularized subject matter of the user email message, and storing the first response message;

creating a second response message that is associated with the first response message and that causes an indication to be received by the system after the second response message is accessed from the user email address;

sending the second response message to the user email address;

receiving the indication after the second response message is accessed from the user email address;

after receiving the indication, making a determination to send either the stored first response message or to re-create the first response message and send the re-created response message, wherein the re-created response message is different than the stored first response message; and based on the determination, sending either the stored first response message or the re-created response message to the user email address.

15. A system for processing incoming user electronic mail (email) messages and sending response messages, the system being programmed to:

receive, in a system, a user email message from a user email address, the user email message comprising particularized subject matter;

create a first response message that is responsive to the particularized subject matter of the user email message, and store the first response message;

create a second response message that is associated with the first response message and that causes an indication to be received by the system after the second response message is accessed from the user email address;

send the second response message to the user email address;

receive the indication after the second response message is accessed from the user email address;

make a determination, after receiving the indication, to send either the stored first response message, or to re-create the first response message and send the re-created response message, wherein the re-created response message is different than the stored first response message; and based on the determination, send either the stored first response message or the re-created response message to the user email address.

* * * * *